(12) United States Patent
Bose et al.

(10) Patent No.: US 6,271,863 B1
(45) Date of Patent: Aug. 7, 2001

(54) INTERACTIVE METHOD FOR OPERATING A COMPUTER SO AS TO GRAPHICALLY DISPLAY THE RESULTS OF A COMPUTATION

(75) Inventors: Supratik Bose, Cambridge, MA (US); Tomasz Marek Plucinski, Chesapeake, VA (US)

(73) Assignee: Alive, Inc., Cambridge, MA (US)

( * ) Notice: Subject to any disclaimer, the term of this patent is extended or adjusted under 35 U.S.C. 154(b) by 1017 days.

(21) Appl. No.: 08/724,088

(22) Filed: Sep. 30, 1996

Related U.S. Application Data

(63) Continuation of application No. 08/222,544, filed on Apr. 4, 1994, now abandoned.

(51) Int. Cl.[7] .................................................. G06F 17/60
(52) U.S. Cl. .......................... 345/440; 707/503; 707/509
(58) Field of Search .................................. 395/140, 141, 395/142, 143, 334, 340, 342, 348, 349, 357; 382/293, 295; 364/188; 345/133, 140, 440, 441, 442, 443, 334, 340, 342, 348, 349, 357; 707/503, 509

(56) References Cited

U.S. PATENT DOCUMENTS

| | | | |
|---|---|---|---|
| 4,675,147 | * | 6/1987 | Schaefer et al. ...................... 376/245 |
| 4,847,785 | * | 7/1989 | Stephens ................................ 395/140 |
| 4,937,743 | * | 6/1990 | Rassman et al. ...................... 364/401 |
| 5,426,723 | * | 6/1995 | Horsley ................................ 395/128 |
| 5,553,212 | * | 9/1996 | Etoh et al. ............................ 395/140 |
| 5,555,354 | * | 9/1996 | Strasnick et al. ..................... 395/127 |

OTHER PUBLICATIONS

Lotus Organizer 1.1, Lotus Development Corporation, 1993, pp. 25–32 and 94–97.*
Microsoft Project Version 4.0, Microsoft Corporation, 1994, screen printout pp. 1–9.*
Lawrence, "Going to Plan (project management)", What Micro, Abstract, 12/1991.*

* cited by examiner

*Primary Examiner*—Stephen S. Hong
(74) *Attorney, Agent, or Firm*—Calvin B. Ward

(57) ABSTRACT

A method for operating a digital computer to provide a display for inputting values needed in a computation and displaying the results of the computation. The method starts by displaying a graphical element on a computer screen, said graphical element being capable of representing the magnitude of one of the input values. The magnitude is changed by using a pointing device to manipulate a specified region on the graphical element. The computer monitors the graphical element for any change therein. Upon detecting such a change, the computer displays the results of the computation in a first graphical display in response to the detected change in the input value represented by the graphical element. The computer then returns to monitoring the graphical element for another change. In one embodiment of the present invention, the graphical elements are arranged to form a second graphical display.

3 Claims, 1 Drawing Sheet

INTERACTIVE METHOD FOR OPERATING A COMPUTER SO AS TO GRAPHICALLY DISPLAY THE RESULTS OF A COMPUTATION

This a continuation application Ser. No. 08/222,544 filed on Apr. 4, 1994, now abandoned.

FIELD OF THE INVENTION

The present invention relates to data processing systems, and more particularly, to an improved user graphical interface.

BACKGROUND OF THE INVENTION

Computer programs that graphically display the results of a computation are well known to the prior art. For example, spread sheets will graph the results of a computation if the results are part of a spread sheet that stores the results in a column or row of a table. In this case, the user typically provides at least two columns or rows, one having the "x-values" of the graph and one having the "y-values" of the graph.

In general, the underlying computation has both dependent and independent variables, the former being generated from the latter and code specifying one or more computations. If the user is interested in the results of the computation for a single set of independent variable values, the spread sheet methodology is quite satisfactory. However, if the user wishes to explore the results for a number of different independent variable values, the spread sheet methodology is found to be less than optimal.

Consider the problem of providing a cash flow analysis and projection for a business on a monthly basis. The independent variables are typically the interest paid on funds in bank accounts, the amount of money coming into, or flowing out of, the business each month. The dependent variable in this case is the cash in the bank at the end of each month. The problem may be setup on a spread sheet with one column entry for each of the variables and a formula for computing the cash balance in the bank at the end of each month. The results for each month would be stored in one column of the spread sheet and would be automatically graphed each time a new independent variable value was inputted by the user. To explore the sensitivity of the cash flow to various assumptions about the independent variable, the user must type in a new value for one of the variables, print out the graph, type a second value for the variable, print out the graph, and so on. The graphs would then be compared with one another manually. This method of exploring the data is slow and error prone.

Broadly, it is the object of the present invention to provide an improved user interface for graphically exploring the results of a computation in an interactive manner.

It is a further object of the present invention to provide an improved method for exploring financial problems involving a number of accounting periods on a computer.

These and other objects of the present invention will become apparent to those skilled in the art from the following detailed description of the invention and the accompanying drawing.

SUMMARY OF THE INVENTION

The present invention is a method for operating a digital computer to provide a display for inputting values needed in a computation and displaying the results of the computation. The method starts by displaying a graphical element on a computer screen, said graphical element being capable of representing the magnitude of one of the input values. The magnitude is changed by using a pointing device to manipulate a specified region on the graphical element. The computer monitors the graphical element for any change therein. Upon detecting such a change, the computer displays the results of the computation in a first graphical display in response to the detected change in the input value represented by the graphical element. The computer then returns to monitoring the graphical element for another change. In one embodiment of the present invention, the graphical elements are arranged to form a second graphical display.

DETAILED DESCRIPTION OF THE INVENTION

Figure 1:
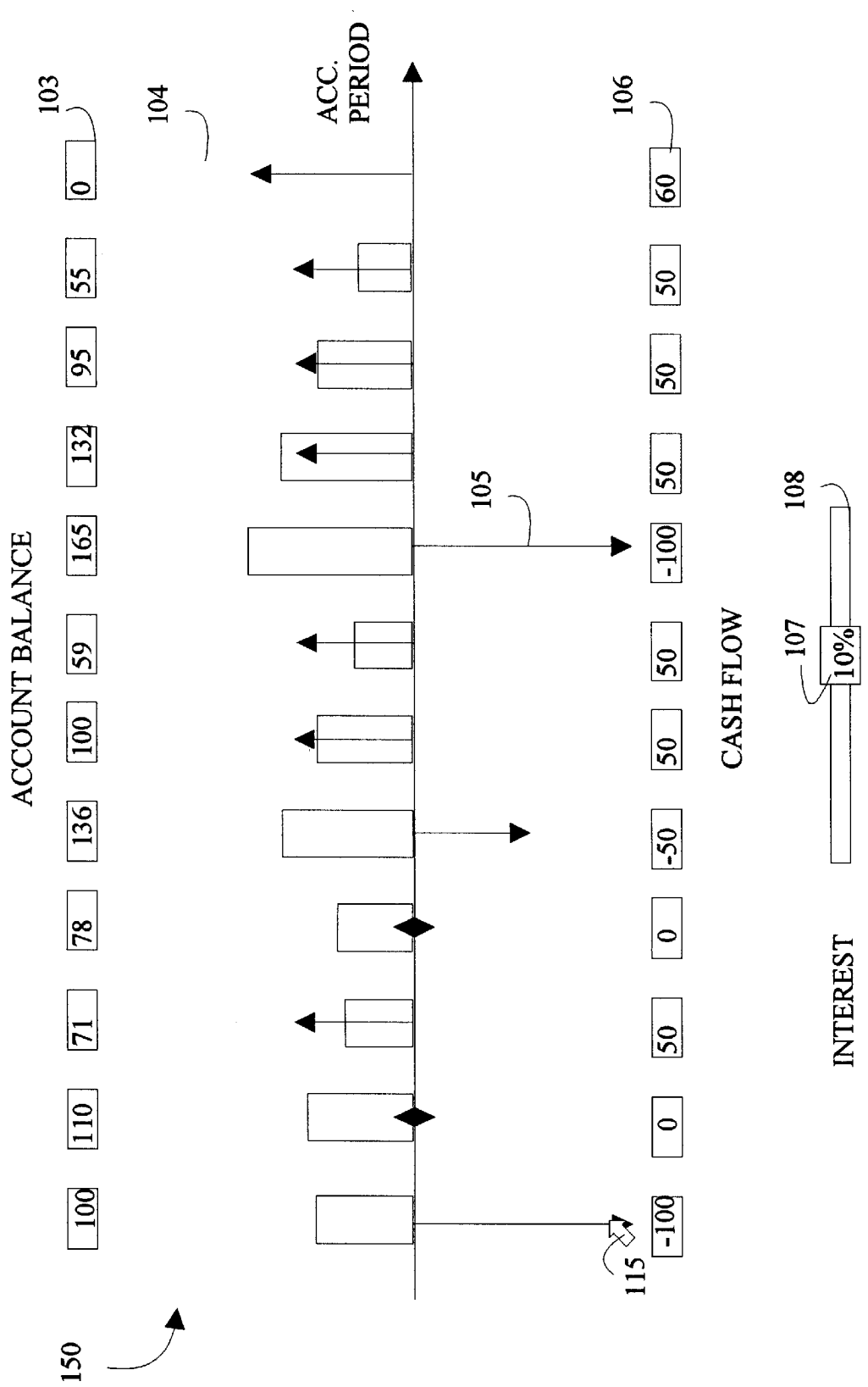
FIG. 1 is an example of a graphical display generated by the method of the present invention.

The present invention differs from conventional spread sheets in that the independent variables are represented graphically by symbols that contain an element that is capable of representing the magnitude of a quantity in some graphical manner and that may be changed by using a mouse or similar pointing device. For example, the magnitude of a variable may be represented by the length of an arrow. In this case the value would be changed by dragging the head of the arrow with the mouse so as to increase or decrease the length of the arrow. "Sliders" perform similar functions. A slider is typically constructed from a linear scale with an object on the scale that may be moved using the mouse. The distance from one end of the scale to the slider represents the value of the variable. A bar in a bar graph may also be used in this manner by dragging the top of the bar so as to extend or contract the length of the bar. Any arrangement of graphed points may also be used by allowing the points to be moved to new locations by dragging individual points with a pointing device. Such graphical aids will be referred to as widgets in the following discussion.

This user interface may be more easily understood with reference to an exemplary computer display for use in displaying the results of a cash flow analysis or model. In the model, a company's bank account is incremented or decremented at the end of each accounting period. The amount of increment or decrement, referred to as the "cash flow", may be input separately for each accounting period. The balance in the bank account at the beginning of the accounting period earns interest at a predetermined rate that may be inputted to the model. The balance in the bank account at the end of the accounting period is displayed as a bar graph, one bar per accounting period. Such a display is shown in FIG. 1 at 150. Each accounting period is characterized by a bank balance which is shown in the form of a bar graph, an exemplary bar being shown at 104. The bank balance is also shown above each bar in digital form such as shown at 103. The cash flow is shown in the form of an array of arrows, one arrow per accounting period, an exemplary arrow is shown at 105. Similarly, the amount of the cash flow is shown digitally below each accounting period, an exemplary digital display being shown at 106. The cash flow variables represent transactions between a company and a bank from the point of view of the company. The downward arrows are negative, representing money taken out of the company and deposited in the bank and the upward arrows are positive, representing money received by the company after a withdrawal from the bank. It is assumed that for each accounting period the money in the bank earns interest at the rate shown in the interest slider 108. In this simple example, the interest rate is assumed fixed for the entire set of accounting periods; however, it will be apparent to those skilled in the art that a separate interest rate widget could be provided for each accounting period in a manner analogous to the arrows used for indicating cash flow. In this case, there would be two sets of independent variables, each represented by graphically arranged widgets.

The user sets up the initial values of the independent variables either by dragging the corresponding arrow or by selecting the cash flow digital display and then typing in a value. The latter form of data entry is analogous to entering data in a data entry field of a data base application. The preferred method of changing a value is by dragging the head of the corresponding arrow. Such "drag" operations are typically performed by positioning the cursor 115 over the head of the arrow and then depressing a button on the pointing device while causing the cursor to move by moving the pointing device. Each time a new value is entered, the program automatically computes the bank balance at the end of each accounting period and displays the result. Hence, the user can drag any of the arrows and view the impact on the entire cash flow model. Similarly, the user can drag the interest slider and view the result of the cash flow model which will change continuously with the position of the interest slider.

In the cash flow analysis, the interest rate and the cash flow in each accounting period constitute the independent variables. Once these are specified, the bank balance at the end of each accounting period and the dependent variables may be calculated and displayed. It will be apparent to those skilled in the art that the method of the present invention may be applied advantageously to a large number of modeling problems. In each case, the independent variables are displayed as graphical widgets. The dependent variable or variables may be displayed in one or more graphical representations.

The present invention is most easily implemented on an object oriented graphical user interface system. In such systems, the operating system provides an interrupt each time the mouse or similar pointing device is "clicked" or moved. The present invention initially displays a user screen showing the independent variables in the form of widgets and the dependent variable or variables in graphical representation using the startup values of the independent variables. The program then waits for an interrupt generated by the pointing device. When an interrupt is detected, the program determines which independent variable has been changed and the new value for that variable. The program then recalculates the dependent variables and displays the graphical representation thereof. If, after redisplaying the dependent variable graphical representation, an independent variable has been changed again, the process is repeated. Hence, the present invention continuously tracks the independent variable and provides a continually updated display of the dependent variable or variables.

While spread sheet programs allow a user to graphically view the result of a computation, these programs do not provide a means for continuously varying an independent variable and watching the graphical display change in a continuous manner. In the case of a spread sheet, the user must select the spread sheet cell containing the independent variable that is to be changed and then type a new value for the independent variable in question. The program will then re-display the dependent variable graph. To view the results for a number of different values of the dependent variable, the user must repeat this process. In the present invention, the user need only drag the widget corresponding to the independent variable and watch the graph continuously update as the widget passes through each value.

In many cases, the user will wish to enter or change the values of the independent variables in a continuous manner. However, in some cases, the user may wish the values to change in predetermined steps. That is, the independent variables may be continuous or quantized. In the case in which the variables are quantized, the slider preferably moves in a continuous manner but the value does not change until the slider moves into the next step. When the user releases the slider, the slider automatically rounds the value to the closest step. In the preferred embodiment of the present invention, the manner in which each independent variable changes in response to the manipulation of the corresponding widget may be entered by selecting the widget using a different mouse key or menu option. For example, the right mouse button may be used to input the attributes of a widget by pointing to the widget and then clicking the widget using the right mouse button.

The widgets may be arranged so as to provide a graphical representation of the independent variables or placed separately depending on the variables represented by the widgets. For example, the arrows shown in FIG. 1 are arranged as a graph in a manner analogous to a bar graph; while the interest rate slider is a separate widget.

Various modifications to the present invention will become apparent to those skilled in the art from the foregoing description and accompanying drawings. Accordingly, the present invention is to be limited solely by the scope of the following claims.

What is claimed is:

1. A method for operating a digital computer to provide a display for entering input values needed in a computation and displaying a result from said computation, said method comprising the steps of:

displaying a graphical element comprising a symbol having a linear dimension representing the magnitude of one of said input values, said magnitude being changeable by using a pointing device to manipulate a specified region on said graphical element thereby changing said linear dimension, said graphical element being displayed on a display screen connected to said digital computer, said input value determining a cash flow in at least one of a plurality of time periods;

repetitively monitoring said graphical element to detect a change in said graphical element; and displaying a graph of a set of points, one of said points corresponding to each of said time periods, wherein one coordinate of each of said points represents a balance in an account during said time period corresponding to that point, and the other coordinate of that point represents said time period corresponding to that point, said graph being displayed each time a change is detected in said graphical element, at least one of said points depending on said input value.

2. The method of claim 1 wherein said step of displaying a graphical element further comprises displaying a plurality of graphical elements, each graphical element having a linear dimension representing one of said input values needed in said computation, said plurality of graphical elements forming a second graphical display.

3. The method of claim 1 wherein said step of displaying a graphical element comprises displaying a plurality of cash flow graphical elements, one cash flow graphical element corresponding to each of said time periods, said cash flow graphical elements being displayed in an ordered array in which each cash flow graphical element is ordered by said time period corresponding to that cash flow graphical element, each cash flow graphical element comprising a symbol having a linear dimension representing the magnitude of a cash flow during said time period corresponding to that cash flow graphical element, said magnitude being changeable by using a pointing device to manipulate a specified region on said graphical element thereby changing said linear dimension.

* * * * *